United States Patent [19]

Smith

[11] Patent Number: 5,187,258

[45] Date of Patent: Feb. 16, 1993

[54] PROCESS FOR PREPARING POLKETONES WITH BORON CONTAINING ANION FROM SUBSTITUTED SALICYLIC ACID AND BORIC ACID

[75] Inventor: Kevin G. Smith, Staines, England

[73] Assignee: The British Petroleum Company p.l.c., London, England

[21] Appl. No.: 497,587

[22] Filed: Mar. 22, 1990

[30] Foreign Application Priority Data

Apr. 5, 1989 [GB] United Kingdom ............... 8907624

[51] Int. Cl.$^5$ ............................................. C08G 67/02
[52] U.S. Cl. ..................................................... 528/392
[58] Field of Search ........................................ 528/392

[56] References Cited

U.S. PATENT DOCUMENTS

| | | | |
|---|---|---|---|
| 4,788,279 | 11/1988 | Drent | 528/392 |
| 4,806,630 | 2/1989 | Drent et al. | 528/392 |
| 4,925,918 | 5/1990 | Brown et al. | 528/392 |
| 5,034,507 | 7/1991 | Smith | 528/392 |

FOREIGN PATENT DOCUMENTS 0314309 5/1989 European Pat. Off. .
0315318 5/1989 European Pat. Off. .

*Primary Examiner*—Harold D. Anderson
*Attorney, Agent, or Firm*—Nixon & Vanderhye

[57] ABSTRACT

An improved process for preparing linear interpolymers of olefin(s) (e.g. ethylene) and carbon monoxide (Polyketones) is provided. The process comprises polymerizing the olefin(s) with carbon monoxide in the presence of a palladium catalyst derived from a palladium source, a bidentate amine, phosphine, arsine or stibine of formula $(R^1)_2M-R^2-M(R^1)_2$ where the M atoms are selected from N, P, As or Sb, the $R^1$ groups are e.g. $C_1$ to $C_4$ alkyl or phenyl and $R^2$ is e.g. $(CH_2)_a$ where a=2 to 10, and a anion prepared by reacting in a 2:1 molar ratio and substituted salicylic acid and boric acid. The salicylic acid is preferably 4- or 5- substituted with methyl, Cl or Br. Using this particular palladium catalyst leads to high polymer yields than e.g. when unsubstituted salicylic acid is employed.

10 Claims, No Drawings

PROCESS FOR PREPARING POLKETONES WITH BORON CONTAINING ANION FROM SUBSTITUTED SALICYLIC ACID AND BORIC ACID

The present invention relates to a process for preparing interpolymers of olefins and carbon monoxide by polymerising a mixture of one or more olefins and carbon monoxide in the presence of a palladium catalyst. In particular, the present invention relates to new palladium catalysts for use in such processes.

The preparation of linear interpolymers of olefins and carbon monoxide having the formula:

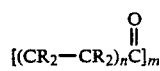

where the R groups are independently hydrogen or hydrocarbyl groups, n is at least 1 and m is a large integer, is known from U.S. Pat. No. 3,694,412. Such linear interpolymers, which hereafter will be called polyketones, are prepared according to U.S. Pat. No. 3,694,412 by polymerising a mixture of one or more olefins and carbon monoxide in the presence of an aryl phosphine complex of a palladium halide and an inert solvent. However, the processes described in U.S. Pat. No. 3,694,412 are slow even at elevated temperature and pressure.

An improved version of the process described in U.S. Pat. No. 3,694,412 is described in European patent applications 181014 and 121965. It was found that the rate of the polymerisation process could be increased considerably by using a palladium catalyst with inter alia a bidentate phosphine and the anion of a carboxylic acid having a pKa of lower than 2 (as measured in aqueous solution). Examples of anions which can be used include trichloroacetate, dichloroacetate, tetrafluoroborate, hexafluorophosphate and p-toluene sulphonate, such anions being respectively the conjugate anions of trichloroacetic acid (pKa 0.70), dichloroacetic acid (pKa=1.48), tetrafluoroboric acid, hexafluorophosphoric acid and p-toluenesulphonic acid.

More recently EP 222454 suggests that any acid having a pKa of less than 5 (determined in aqueous solution at 18° C.) can be used.

Our recent European patent application 314309 discloses that if anions of certain boron containing acids, which anions have formulae such as:

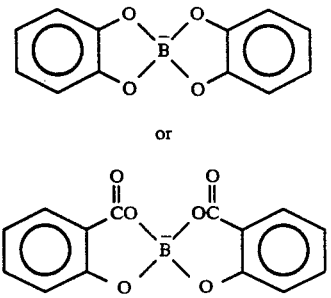

are used instead of the anions disclosed in either EP 181014 or 222454, then particularly high reaction rates can be achieved. Furthermore, if such anions are employed, lower catalyst deactivation on recycle is observed relative to previously described systems.

Whilst good reaction rates can be achieved using such anions, it is clearly desirable if possible to secure a further increase in reaction rates. The problem to be solved is therefore to improve the rate of polyketone production obtained using a catalyst system comprising a palladium catalyst, a bidentate phosphine or the like and an anion.

Accordingly, the present inventions provides a process for preparing polyketones by polymerising a mixture of carbon monoxide and one or more olefins in the presence of a palladium catalyst characterised in that the palladium catalyst is prepared by reacting together:

(a) a source of palladium,
(b) a bidentate amine, phosphine, arsine or stibine having the formula $(R^1)_2M—R^2—M(R^1)_2$ wherein the M atoms are independently selected from nitrogen, phosphorus, arsenic or antimony, the $R^1$ are independently alkyl, cycloalkyl or aryl groups and $R^2$ is an alkylene group, and
(c) a source of an anion having the formula:

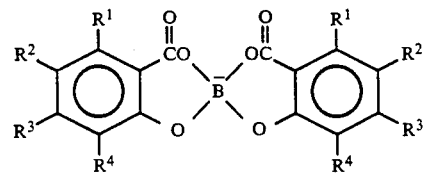

wherein $R^1$, $R^2$, $R^3$ and $R^4$ are independently selected from the group consisting of hydrogen, $C_1$ to $C_6$ alkyl, chlorine, bromine and iodine with the proviso that at least one of $R^1$, $R^2$, $R^3$ and $R^4$ is other than hydrogen.

The present invention solves the problem by using certain selected anions of boron containing acids. Their use leads to an increase yield of polyketone in a given period of time.

The anion employed in the process of the present invention is one having the formula given above in which $R^1$, $R^2$, $R^3$ and $R^4$ are independently selected from hydrogen, $C_1$ to $C_6$ alkyl, chlorine, bromine and iodine. This is subject to the proviso that at least one of these groups are other than hydrogen. Preferred derivatives are those where one of $R^1$, $R^2$, $R^3$ and $R^4$ is selected from the $C_1$ to $C_4$ alkyl, chlorine and bromine with the other three groups being hydrogen. Most preferred are those anions prepared by reacting 1 mole of boric acid with 2 moles of an acid selected from 5-chlorosalicylic acid, 5- or 4-methylsalicylic acid and 5-bromosalicylic acid.

The palladium catalyst used in the process described above is itself prepared by reacting together a source of palladium, an appropriate amine, phosphine, arsine or stibine and anion having the formula defined above. Such a catalyst can be prepared beforehand or generated in situ under the process conditions. As regards the source of palladium this can include simple inorganic and organic salts, e.g. halides, nitrates, carboxylates and the like as well as organometallic and coordination complexes.

Although any source of palladium can be used, it may be necessary, when a palladium complex having strongly coordinating ligands is employed, to ensure that such ligands are removed prior to reaction with the other catalyst components. An example of such a complex is palladium acetate where acetate anions bind strongly to the palladium. In this case the acetate anions can be removed by adding catalyst component (c) above as its conjugate acid since this will protonate the acetate anions and cause their removal.

Another approach, which is useful when palladium halides are employed (halide anions also bind strongly to the palladium), is to use a thallium or silver salt of catalyst component (c). In this case a metathesis reaction occurs and insoluble silver or thallium halide precipitates which can be removed by filtration.

The other component of the catalyst is a bidentate amine, phosphine, arsine or stibine having the formula $(R^1)_2M-R^2-M(R^1)_2$ where the M atoms are independently selected from nitrogen, phosphorus, arsenic or antimony. The $R^1$ groups are independently selected from alkyl, cycloalkyl or aryl groups with $C_1$ to $C_4$ alkyl and phenyl groups being preferred. The $R^2$ group is an alkylene group. In the context of this document alkylene groups are defined as being $-(CH_2)_a(CHR^3)_b-$ groups in which the $R^3$ groups are independently hydrogen, methyl, ethyl or propyl groups and a and b are either zero or integers such that a+b is at least 2, preferably between 2 and 10. Preferably the alkylene group is selected from $-(CH_2)_2-$, $-(CH_2)_3-$, $-(CH_2)_4-$ and $-(CH_2)_5-$. Of these the most convenient species are the bidentate phosphines, 1,2-bis(diphenylphosphino)ethane (diphos), 1,3-bis(diphenylphosphino)propane and 1,4-bis(diphenylphosphino) butane.

The bidentate amines, phosphines, arsines or stibines defined above all either bond exclusively cis to the palladium or there is a reasonable concentration of this cis binding. Whilst not wishing to be held to any theory, it is believed that it is the cis type isomer of the palladium complex which is catalytically active.

Considering next the feedstocks for the polymerisation feedstock, it is believed that any reasonably pure source of carbon monoxide can be used. Thus the carbon monoxide may contain small amounts of nitrogen, inert gases and up to 10% hydrogen.

Any olefin can in theory be used although the best reaction rates are obtained when $C_1$ to $C_{10}$ alpha-olefins especially when either ethylene or a mixture of olefins which include ethylene, e.g. ethylene/propylene, ethylene/butylene and the like, are used. The lower rates obtained in the absence of ethylene should not however be construed as indicating that the process can be used only with an ethylene feedstock since other olefins such as propylene, 4-methylpentene-1, styrene, acrylates, vinyl acetates and the like all undergo reaction to some extent.

The polymerisation process is suitably carried out in a solvent which is chemically inert under the conditions employed and one in which the palladium catalyst is soluble. Moreover, the solvent like the anion should be either weakly or non-coordinating. Examples of such solvents include alcohols, e.g. methanol, ethanol and propanol, ethers, glycols and glycol ethers. Preferred solvents are methanol or ethoxyethanol.

The polymerisation process is suitably carried out at a temperature in the range 20° to 150° C. and at elevated pressure, (e.g. 1 to 100 bars). The overpressure of gas is suitably supplied by the carbon monoxide or carbon monoxide and the olefin, if the olefin is gaseous under the reaction conditions. It is possible to operate the polymerisation process either batchwise or continuously.

The following Examples illustrate the present invention.

EXAMPLE 1

Comparative Example Using the Anion of Borosalicylic Acid

A stainless steel autoclave of 150 ml capacity was charged with palladium acetate (25 mg), 1.3-bis(diphenylphosphino)propane (66 mg), borosalicylic acid (HBSA) (600 mg), methanol (39 cm$^3$) and a magnetic stirrer bar. The autoclave was flushed with nitrogen, charged with ethylene (20 bar) and thereafter carbon monoxide (30 bar), and heated to 100° C. After 0.7 hours gas uptake had virtually ceased and a pressure drop of 29.0 bar had been recorded. The vessel was allowed to cool over a period of 1½ hours, and was vented at 30° C. The polymer was recovered by filtration, washed with methanol, then acetone and air dried at room temperature. 4.62 g of polymer was recovered.

EXAMPLES 2-5

Use of Anions according to the Invention

The method of Example 1, except that HBSA was replaced with a mixture of the relevant substituted salicylic acid and boric acid (2:1 molar). The results are recorded in Table 1.

TABLE 1

| Example | Salicylic Acid Derivative | Wt of SAD* mg | Wt of Boric Acid mg | P bar | Time h | Wt of Polymer g |
|---|---|---|---|---|---|---|
| 2 | 5-Chloro | 690.3 | 122.8 | 32.6 | 0.46 | 6.41 |
| 3 | 5-Methyl | 608.9 | 123.0 | 24.7 | 0.36 | 5.89 |
| 4 | 4-Methyl | 607.9 | 123.4 | 25.7 | 0.48 | 5.05 |
| 5 | 5-Bromo | 868.7 | 122.8 | 30.5 | 0.80 | 5.27 |

*SAD = Salicylic Acid Derivative

Examples 2-5 clearly show the improved yields of polymer obtained relative to the prior art material exemplified by Example 1.

I claim:

1. A process for preparing polyketones, comprising polymerizing a mixture of carbon monoxide and one or more olefins in the presence of a palladium catalyst, said palladium catalyst being prepared by reacting together:
   (a) a source of palladium,
   (b) a bidentate amine, phosphine, arsine or stibine having the formula $(R^1)_2M-R^2-M(R^1)_2$ wherein the M atoms are independently selected from the group consisting of nitrogen, phosphorus, arsenic and antimony, the $R^1$ groups are independently selected from the group consisting of alkyl, cycloalkyl and aryl groups and $R^2$ is an alkylene group, and
   (c) a source of an anion having the formula:

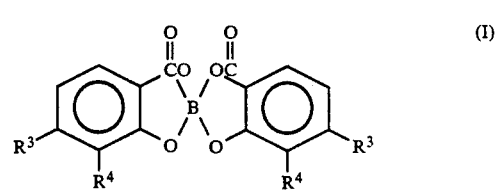

wherein the $R^3$ and $R^4$ groups are independently selected from the group consisting of hydrogen, $C_1$ to $C_6$ alkyl, chlorine, bromine and iodine with the proviso that both of the $R_4$ groups are other than hydrogen.

2. A process as claimed in claim 1, wherein the anion of formula (I) is one in which the $R^3$ groups are hydrogen.

3. A process as claimed in claim 2, wherein the anion of formula (I) is one in which the $R^4$ groups are independently selected from the group consisting of $C_1$ to $C_4$ alkyl, chlorine and bromine.

4. A process as claimed in claim 3, wherein the anion of formula (I) is one in which the $R^4$ groups are independently selected from the group consisting of methyl, chlorine and bromine.

5. A process as claimed in claim 2, wherein the anion of formula (I) is one in which the $R^3$ groups are independently selected from the group consisting of $C_1$ to $C_4$ alkyl, chlorine and bromine.

6. A process as claimed in claim 5, wherein the anion of formula (I) is one in which the $R^3$ groups are methyl.

7. A process as claimed in claim 2, wherein the anion of formula (I) is generated from a mixture of the corresponding salicylic acid and boric acid.

8. A process as claimed in claim 7, wherein the anion of formula (I) is generated in situ under the reaction conditions from a 2:1 molar ratio mixture of the corresponding salicylic acid and boric acid.

9. A process as claimed in claim 1, wherein either ethylene or a mixture of ethylene and propylene or ethylene and butylene is polymerized.

10. A process as claimed in claim 1, comprises polymerizing in the presence of either methanol or oxyethanol.

* * * * *